United States Patent [19]

Pierrat

[11] Patent Number: 5,319,991
[45] Date of Patent: Jun. 14, 1994

[54] MOTOR COUPLING WITH ANGULAR COMPLIANCE

[76] Inventor: Michel A. Pierrat, 542 Bari Ct., Boulder, Colo. 80303

[21] Appl. No.: 909,066

[22] Filed: Jul. 2, 1992

Related U.S. Application Data

[63] Continuation-in-part of Ser. No. 727,647, Jul. 9, 1991, Pat. No. 5,184,260, which is a continuation-in-part of Ser. No. 555,576, Jul. 10, 1990, abandoned, which is a continuation-in-part of Ser. No. 679,910, Apr. 3, 1991, abandoned.

[51] Int. Cl.$^5$ .......................... F16H 25/20; F16D 3/10
[52] U.S. Cl. ................................ 74/89.15; 192/141; 310/41; 464/160
[58] Field of Search ............... 74/89.15, 424.8 R; 192/141, 143; 310/41; 464/160

[56] References Cited

U.S. PATENT DOCUMENTS

| | | | |
|---|---|---|---|
| 1,551,512 | 8/1925 | Goff | 192/141 X |
| 2,620,911 | 12/1952 | Krell | 192/141 |
| 3,146,756 | 9/1964 | Shimanckas | 464/160 X |
| 3,347,451 | 10/1967 | Vind | 464/160 X |
| 4,479,397 | 10/1984 | Jelinek et al. | 192/141 |
| 4,666,026 | 5/1987 | Poulin | 192/141 |
| 4,728,832 | 3/1988 | Jatnieks et al. | 310/41 |
| 4,752,276 | 6/1988 | Fukumoto | 464/160 |
| 4,759,192 | 7/1988 | Bertram et al. | 464/160 X |
| 4,793,458 | 12/1988 | Shealy | 192/143 X |
| 4,889,002 | 12/1989 | Abraham | 464/160 X |

*Primary Examiner*—Allan D. Herrmann

[57] ABSTRACT

A reversible drive system is provided that is particularly adaptable to low-power drives in which precision mechanical control must be obtained with the lowest possible cost and the highest reliability. The drive is described as incorporated in a lead screw drive in which a control nut reciprocates between two fixed positions. At the end of the movement in one direction, the control nut strikes a fixed abutment that stops the motion thereby increasing the load on the drive motor and causing an increase in the current drawn by the motor. This increase in current is utilized to disconnect the power source from the motor. In such systems, in particular where there is a large reduction in the speed between the motor and the driven object, as with the use of a lead screw drive arrangement, it is desirable to store energy at the end of each stroke that is available to decrease the starting torque required to reverse the direction of motion. To provide additional starting torque, the motor coupling includes a lost-motion coupling by which no significant load is placed on the motor until the output shaft of the motor, or an element driven by the motor, has moved through some fraction of a revolution. For most applications a lost-motion arrangement equivalent to about one hundred eighty degrees of motion is practical.

4 Claims, 2 Drawing Sheets

MOTOR COUPLING WITH ANGULAR COMPLIANCE

REFERENCE TO RELATED APPLICATIONS

This application is a continuation-in-part of application Ser. No. 07/727,647 filed Jul. 9, 1991, now U.S. Pat. No. 5,184,260, entitled MAGNETIC TAPE DRIVE WITH INTEGRAL MULTIPLE-CASSETTE REMOVABLE MAGAZINE which is a continuation-in-part of applications Ser. No. 07/555,576 filed Jul. 10, 1990, now abandoned, and Ser. No. 07/679,910, filed Apr. 3, 1991, now abandoned.

BACKGROUND OF THE INVENTION

1. Field of the Invention

This invention relates to motor drive systems and in particular to reversible motor drives in which the travel of the drive mechanism is limited by mechanical blockage.

2. Description of Related Art

In many different types of small devices it is necessary to limit the travel of a particular mechanical movement and to then reverse the direction of travel. It is usual to interrupt the travel at the desired point by use of some device for sensing when the moving structure has reached some predetermined position. For example, a mechanical switch, a photodetector or other sensing device may be used to control the drive system. In many low-power drives, however, where cost and space are important considerations, it is advantageous to merely stop the motor by mechanical means and then to remove or reverse the current to the motor by responding to the lack of motion or the typical increase in the current drawn by the electric motor. Such a system may utilize a slip clutch in series with the motor, as described in the above-mentioned application Ser. No. 07/727,647, now U.S. Pat. No. 5,184,260. In most instances, however, the use of mechanical stop means has been avoided by the use of more expensive sensor mechanisms. One reason for using such sensors is because of the tendency of such drive systems to "freeze" at the end of the mechanical stroke, particularly in drives having a substantial speed reduction, into a condition where the typical low-power inexpensive motor does not generate sufficient starting torque to initiate the drive in the opposite direction.

SUMMARY OF THE INVENTION

A reversible drive system is provided that is particularly adaptable to low-power drives in which it is desired to attain precision mechanical control at the lowest possible cost and the with the highest reliability. The drive is described as incorporated in a lead screw drive in which a control nut reciprocates between two fixed positions. At the end of the movement in one direction, the control nut strikes a fixed abutment that stops the motion thereby increasing the load on the drive motor and causing an increase in the current drawn by the motor. This increase in current is utilized to disconnect the power source from the motor. In such systems, in particular where there is a large reduction in the speed between the motor and the driven object, as with the use of a lead screw drive arrangement, it is desirable to store energy at the end of each stroke that is available to decrease the starting torque required to reverse the direction of motion. This energy storage may be obtained from a coil or other spring mechanism or from the use of an elastic material such as a plastic O-ring. To provide an additional starting torque, the motor coupling includes a lost-motion coupling by which no significant load is placed on the motor until the output shaft of the motor has rotated through some predetermined distance. For most applications, a lost-motion arrangement equivalent to about one hundred eighty degrees of motion is practical.

DESCRIPTION OF THE PREFERRED EMBODIMENT

The above referenced application Ser. No. 07/727,647, now U.S. Pat. No. 5,184,260, describes an autoloader for storing and retrieving magnetic tape cassettes of the kind widely used for back-up of computer digital data and that description is incorporated herein by reference. The cassettes are positioned in two parallel decks in a removable magazine. A robot arm transfers the cassettes to and from a tape deck where the data is recorded and read. It is important that such a mechanism require the minimum of individual adjustment, be highly reliable, and be capable of manufacture at minimum cost. These exacting requirements preclude, in may cases, the use of mechanical or optical sensors for determining the position of moving parts and generating control signals for the motor that drives the moving parts. A preferred system is to couple an electric motor directly to the device to be actuated and to allow the motor to continue to move the part until it is prevented from doing so by a fixed obstruction. The resulting increase in current drawn by the motor is utilized as a signal to interrupt the power source.

Figure 1:
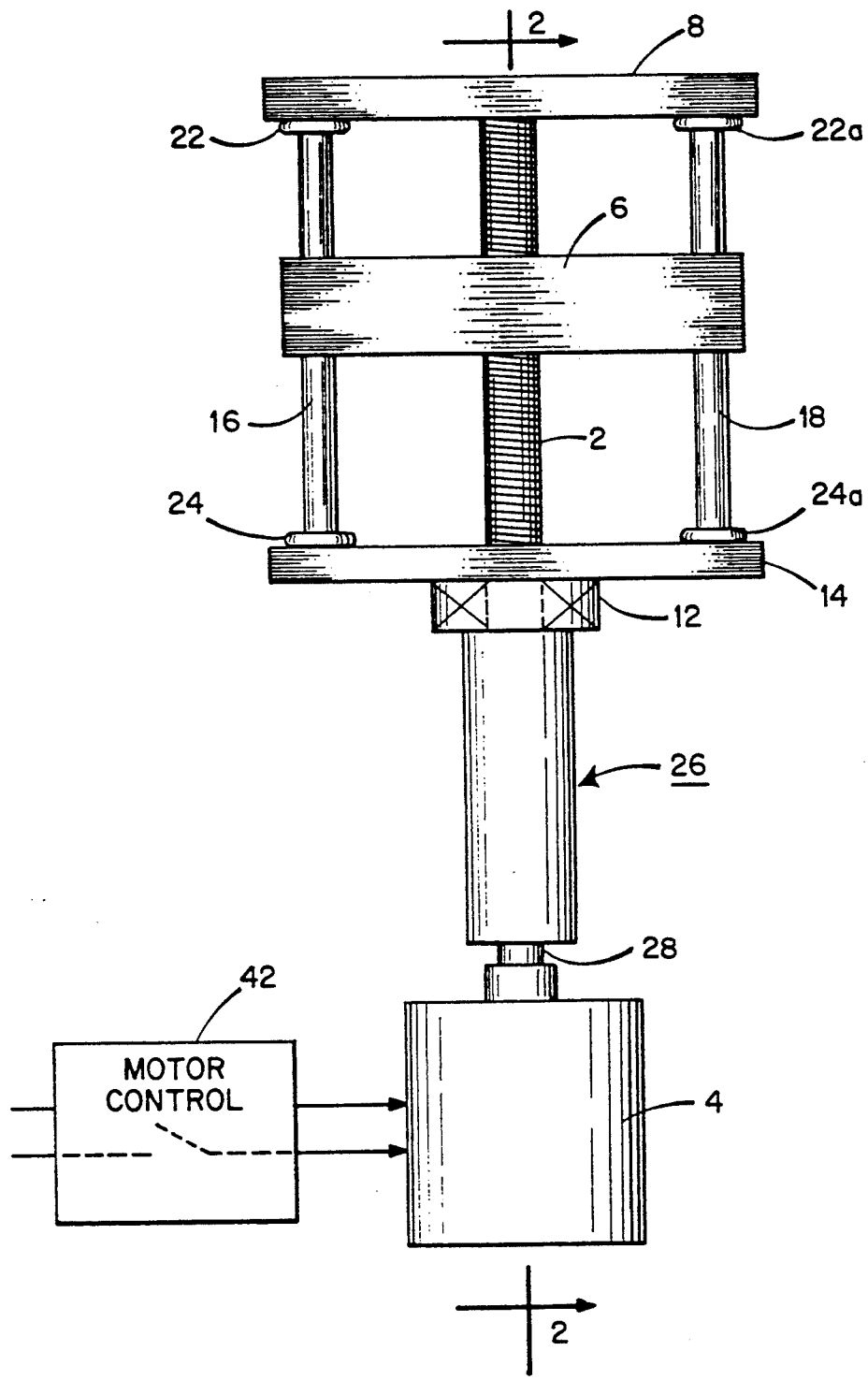
FIG. 1 shows a drive system in which a mechanism is actuated by a nut mounted on a motor-driven screw.

For example, as illustrated by FIG. 1, a drive screw 2 is arranged to be driven by an electric motor 4. The screw 2 drives a nut 6, in threaded engagement with the screw 2, to actuate the desired mechanism. In the autoloader just described, the nut may be utilized to actuate the gripper holding the cassette being carried between the magazine and the entrance of the tape deck.

The screw 2 is rotatably supported by an upper platform 8 and a bearing 12 secured to a lower platform 14. The nut 2 is slidably mounted on a pair of supporting columns 16 and 18 extending between the platforms 8 and 14. When the motor 4 is actuated to rotate the screw 2 and lift the nut 6 upwardly, the action continues until further movement of the nut 2 is prevented by the platform 8. With this arrangement, there is a tendency for the mechanism to jam so that when the motor is reversed there is not sufficient torque to drive the screw 2 in the reverse direction. To alleviate this condition, an energy storage device is provided at each end of the stroke. This may be in the form of a spring that is compressed during the final increment of motion of the screw 2. In this example, a pair of elastic O-rings 22 and 22a are positioned around the columns 16 and 18, respectively, at the upper ends adjacent the platform 8. When the nut 2 reaches the upper end of its stroke, the O-rings are compressed and the energy stored in the O-rings assists in reducing the force required to reverse the direction of movement of the nut 2. A similar pair of O-rings 24 and 24a surround the columns 16 and 18 at the lower ends to produce the same effect when the nut 2 is stopped from further movement by the platform 14.

This arrangement is satisfactory if the drive motor 4 has sufficient starting torque. However, for reasons of economy and size it is important to be able to use a dc motor with minimum starting torque. The initial torque of such a motor depends upon the particular position in which the rotor is stopped at the end of the movement. If the magnetic fields are in position to produce minimum torque at the starting position, it is either necessary to use a larger or a more expensive motor. Neither of these alternatives is desirable in a unit such as the one described here in which both size and cost are critical items. By allowing the motor to start and move a limited part of one revolution before the load is applied, this difficulty is overcome and the use of a small inexpensive motor becomes practical.

Figure 2:
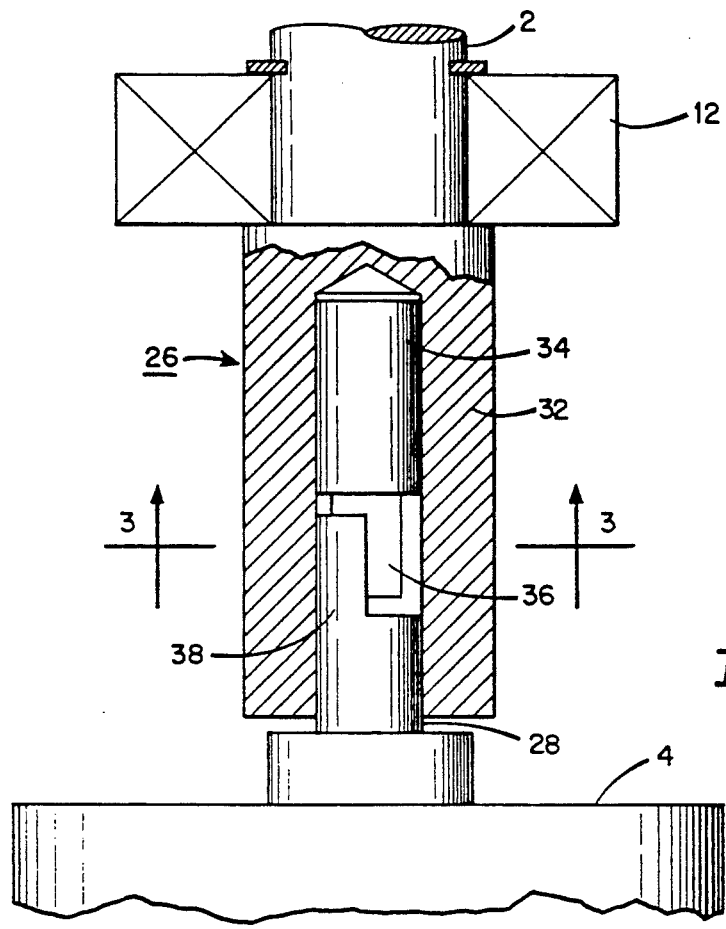
FIG. 2 is an enlarged partial section through the coupling element along line 2—2 of FIG. 1.
Figure 3:
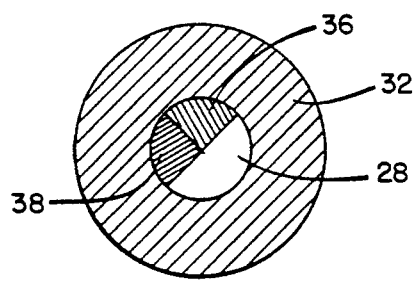
FIG. 3 is a section along line 3—3 of FIG. 2.
Figure 4:
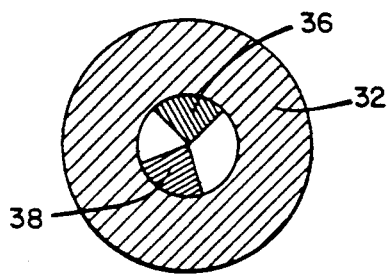
FIGS. 4 and 5 are views similar to FIG. 3 with the motor drive shaft at different positions during reversal of the cycle.
Figure 5:
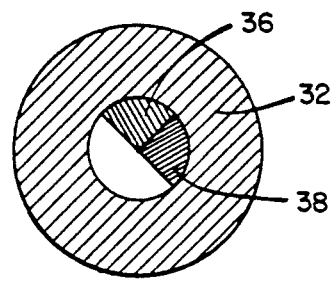

A coupling, generally indicated at 26, connects the motor drive shaft 28 with the screw 2. As shown in FIG. 2, the coupling includes a shaft extension 32 that is rigidly secured to the screw 2. The motor drive shaft 28 is slidably mounted within the driven shaft extension 32. The shaft extension 32 is rotatably mounted in the bearing 12 which provides radial and thrust resistance for the shaft extension 32. A coupling element 34 is press-fitted inside the shaft extension 32. A first integral tab 36 extending from the inner end of the coupling element 34 engages a second similar tab 38 integral with and extending from the end of the motor drive shaft 28. The dimensions of the tabs 36 and 38 are such that limited angular compliance is provided between the motor drive shaft 28 and the driven screw 2. For example, as shown in the cross section of FIG. 3 in which the tab 38 on the motor shaft 28 is in position to drive the screw 2 by means of the tab 36 of the coupling element 34 in a clockwise direction. When the motor stops, the tabs 36 and 38 remain in contact as shown in FIG. 3. When the motor is reversed, to run counter clockwise, as viewed in FIG. 4, the tab 38 moves angularly away from the tab 36 since the motor drive shaft 28 is free to rotate inside the coupling 26. Continuing motion of the drive shaft brings the tab 38 in contact with the other side of the tab 36 (FIG. 5) to rotate the screw 2 in a counter clockwise direction. In this example, the tabs 36 and 38 each form a ninety-degree segment of a full circle so that the motor shaft 28 always has one-half revolution when reversed during which time it is free from an external load. This permits the motor to accelerate and carry the load of the screw 2.

The power to the motor 4 is controlled by an electronic motor control unit, illustrated in block form at 42 in FIG. 1. The circuits for interrupting the current to the motor in response to the increased motor current resulting from an increased motor load are well-known to those skilled in this art.

I claim:

1. A drive system comprising
   an electric motor having an output shaft,
   means for reversing the direction of rotation of said motor,
   a driven structure including
      mechanical motion limiting means for interrupting the movement of the driven structure at a predetermined location.
   means coupling said motor to said structure including
      a first drive tab connected to said motor and having a cross-section significantly less than 180 degrees, and
      a second drive tab juxtaposed to said first tab and connected to said driven structure and having a cross-section significantly less than 180-degrees,
   means forming part of said mechanical motion limiting means for storing mechanical energy and releasing said energy upon reversal of said motor, and
   mean responsive to said motion limiting means for interrupting the power to said motor.

2. The system as claimed in claim 1 wherein said first and second drive tabs have a cross section of about ninety degrees.

3. The system as claimed in claim 1 wherein
   said drive structure comprises a control nut, and
   a screw drive engaging said nut and connected to said second drive tab.

4. The system as claimed in claim 3 wherein
   said energy storage means includes an elastic O-ring positioned between said driven structure and said motion limiting means.

* * * * *